No. 628,717. Patented July 11, 1899.
R. A. LONGFIELD & J. KLINE.
CULINARY UTENSIL.
(Application filed Apr. 21, 1899.)
(No Model.)
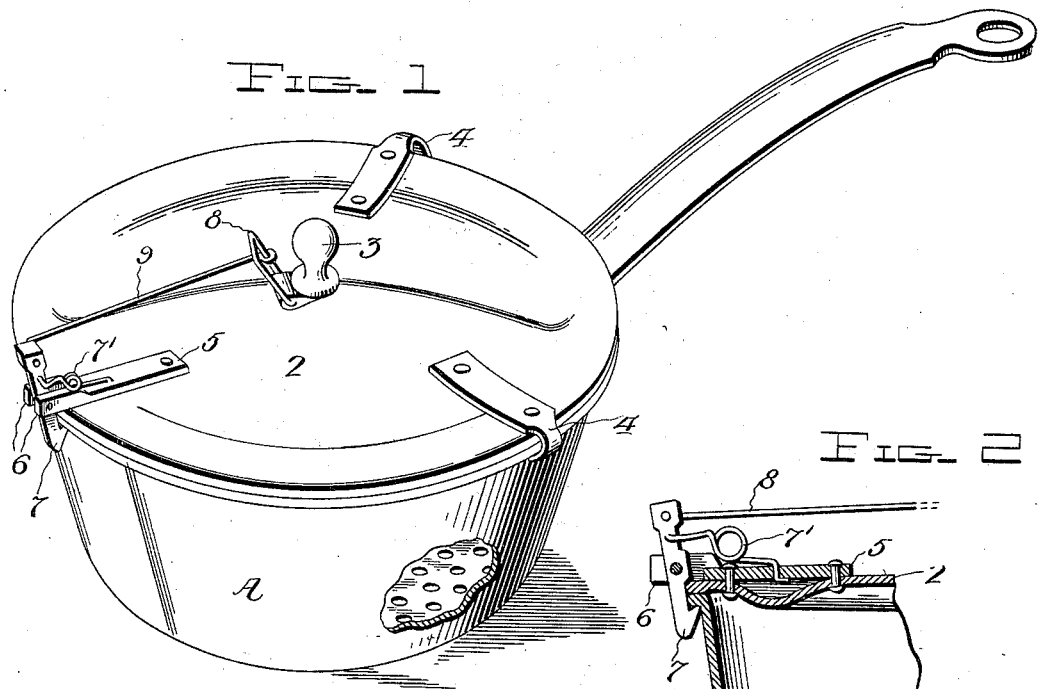
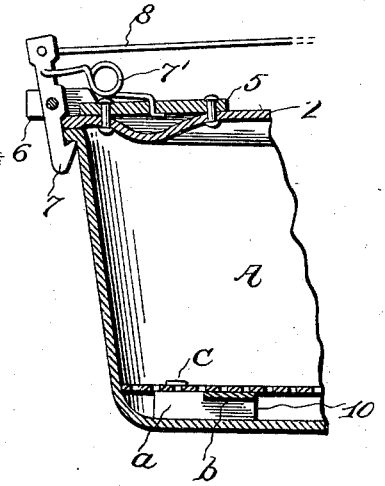
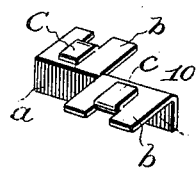
Inventors
Richard A. Longfield
and John Kline
by H. B. Willson & Co.
Attorneys
Witnesses

UNITED STATES PATENT OFFICE.

RICHARD A. LONGFIELD AND JOHN KLINE, OF MILWAUKEE, WISCONSIN.

CULINARY UTENSIL.

SPECIFICATION forming part of Letters Patent No. 628,717, dated July 11, 1899.

Application filed April 21, 1899. Serial No. 713,869. (No model.)

*To all whom it may concern:*

Be it known that we, RICHARD A. LONGFIELD and JOHN KLINE, citizens of the United States, residing at Milwaukee, in the county of Milwaukee and State of Wisconsin, have invented certain new and useful Improvements in Culinary Utensils; and we do declare the following to be a full, clear, and exact description of the invention, such as will enable others skilled in the art to which it appertains to make and use the same.

The invention has relation to culinary utensils; and the object of the invention is to provide a simple, durable, and effective means for securing the cover of a vessel in position, whereby the same will not be accidentally knocked off in moving the vessel about on the stove.

With this object in view the invention consists in certain features of construction and combination of parts, which will be hereinafter more fully described and claimed.

In the accompanying drawings the same reference characters indicate the same parts of the invention.

Figure 1 is a perspective view of the device, a portion of the vessel being broken away. Fig. 2 is a vertical sectional view through one side of the vessel and on an enlarged scale, and Fig. 3 is an enlarged view of one of the supporting-feet for the perforated false bottom.

In the drawings, A denotes the vessel, which in the present instance is in the form of a stew-pan.

2 denotes the cover, operated centrally with a lifting-knob 3 and having secured to and projecting downwardly from its edges fixed hooks 4, which are adapted to engage the rim of the stew-pan or vessel. Arranged at a point opposite these fixed hooks is a plate 5, having parallel edges 6, which project beyond the edge of the cover. Between these parallel edges 6 is pivoted a downwardly-projecting hook 7, which is also adapted to engage the rim of the stew-pan or vessel. A coil or other form of spring 7' exerts its energy to hold the lower end of the hook in engagement with the rim of the pan.

8 denotes an operating-lever pivoted to the cover in close proximity to the lifting-knob, whereby in the act of lifting the cover by said knob the lever may be grasped simultaneously with the knob and actuated. This lever is connected to the upper end of the pivoted hook by a link 9. It is therefore evident that with one hand the lever may be released from its engagement with the vessel and removed from over the top thereof.

The stew-pan is preferably provided with a perforated false bottom, which is held above the bottom of the pan by the feet 10, one of which is shown in detail in Fig. 3. These feet have each a longitudinal straight portion $a$, which rests on the bottom of the pan, and an angular portion $b$, which projects in opposite directions and supports the perforated bottom. Each of the angular portions is provided with a tongue $c$, which projects up through the perforations of the bottom and are then bent down or clenched in place.

Having thus fully described our invention, what we claim, and desire to secure by Letters Patent of the United States, is—

1. The combination with the stew-pan, of a false perforated bottom, and feet for supporting the false bottom above the stew-pan, said feet consisting of a longitudinal strip of metal, having angular oppositely-projecting flanges, each of which is provided with a tongue that projects upwardly from the perforations in the false bottom and are then bent down or clenched, substantially as and for the purpose set forth.

2. The combination with the stew-pan, a cover provided with a lifting knob or handle and with fixed hooks projecting from its edges, of a hook pivoted to said cover and projecting over its edge, a lever pivoted in close proximity to the knob or handle whereby the two may be simultaneously grasped, and a link connecting the lever with the hook for disengaging it from the pan, substantially as and for the purpose set forth.

In testimony whereof we have hereunto set our hands in presence of two subscribing witnesses.

RICHARD A. LONGFIELD.
JOHN KLINE.

Witnesses:
CAROLINE RHEINS,
JENNIE MUND.